United States Patent
Taylor et al.

(10) Patent No.: US 10,142,959 B1
(45) Date of Patent: Nov. 27, 2018

(54) SYSTEM AND METHOD FOR UPDATING AN ACCESS POINT MODEL

(71) Applicant: Google LLC, Mountain View, CA (US)

(72) Inventors: Isaac Richard Taylor, Mountain View, CA (US); Mohammed Waleed Kadous, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 80 days.

(21) Appl. No.: 15/607,952

(22) Filed: May 30, 2017

Related U.S. Application Data (63) Continuation of application No. 14/197,808, filed on Mar. 5, 2014, now abandoned.
(Continued)

(51) Int. Cl.
*H04W 64/00* (2009.01)
*H04W 72/04* (2009.01)
(Continued)

(52) U.S. Cl.
CPC ......... *H04W 64/003* (2013.01); *H04W 24/08* (2013.01); *H04W 72/02* (2013.01);
(Continued)

(58) Field of Classification Search
CPC ... H04W 64/003; H04W 72/04; H04W 24/08; H04W 72/02; H04W 48/16; H04W 48/20; H04W 24/04
(Continued)

(56) References Cited

U.S. PATENT DOCUMENTS 6,289,318 B1 * 9/2001 Barber .................. G06Q 30/02
705/14.16
6,766,947 B2 7/2004 Wan et al.
(Continued)

FOREIGN PATENT DOCUMENTS

WO 2008014255 A2 1/2008
WO 2010107817 A1 9/2010
(Continued)

OTHER PUBLICATIONS

Nye, Carolyn. Email Marketing for the Holidays, Part 2: Implementation. Practical E-Commerce. Sep. 17, 2013, [online], [retrieved on Nov. 15, 2016]. Retrieved from the internet <URL: http://www.practicalecommerce.com/articles/58641-Email-Marketing-for-the-Holidays-Part-2-Implementaton>.
(Continued)

*Primary Examiner* — Babar Sarwar
(74) *Attorney, Agent, or Firm* — Lerner, David, Littenberg, Krumholz & Mentlik, LLP (57) ABSTRACT

Aspects of the disclosure relate to generating or updating an access point model. The model may be generated based in part on access point model data, e.g., collected scan information from devices that travel through an indoor space. The wireless access point model may include an indoor map of a location or building. At some point, it may be determined that the access point model data may not meet a predetermined quality threshold. For example, the data may be outdated or inaccurate. A request is generated and transmitted to a client device within a predetermined distance of the access point associated with the access point model. In response to the request, the device travels to the indoor space associated with the access point to collect scan information. The scan information is used to update or otherwise modify the access point model.

21 Claims, 5 Drawing Sheets

Related U.S. Application Data (60) Provisional application No. 61/773,276, filed on Mar. 6, 2013.

(51) Int. Cl.
   | | |
   |---|---|
   | *H04W 24/08* | (2009.01) |
   | *H04W 72/02* | (2009.01) |
   | *H04W 24/04* | (2009.01) |
   | *H04W 48/20* | (2009.01) |
   | *H04W 48/16* | (2009.01) |

(52) U.S. Cl.
   CPC ............ *H04W 72/04* (2013.01); *H04W 24/04* (2013.01); *H04W 48/16* (2013.01); *H04W 48/20* (2013.01)

(58) Field of Classification Search
   USPC ............ 455/404.2, 412.1–414.2, 418–422.1, 455/435.2, 436, 444, 446, 41.1–41.2, 455/552.1, 456.1, 457
   See application file for complete search history.

(56) References Cited

U.S. PATENT DOCUMENTS

| | | | |
|---|---|---|---|
| 7,027,801 B1 | 4/2006 | Hall et al. | |
| 7,532,898 B2 | 5/2009 | Halcrow et al. | |
| 7,653,576 B2 | 1/2010 | Boss et al. | |
| 7,698,566 B1 | 4/2010 | Stone | |
| 7,775,880 B2 | 8/2010 | Downes | |
| 7,899,403 B2 | 3/2011 | Aaron | |
| 8,027,879 B2 | 9/2011 | Ramer et al. | |
| 2003/0100315 A1* | 5/2003 | Rankin | H04M 3/487 455/456.3 |
| 2004/0093274 A1* | 5/2004 | Vanska | G01C 21/20 705/26.7 |
| 2004/0176040 A1* | 9/2004 | Thornton | H04W 24/00 455/67.11 |
| 2005/0160004 A1 | 7/2005 | Moss et al. | |
| 2005/0256782 A1* | 11/2005 | Sands | G06Q 10/087 705/26.41 |
| 2006/0004631 A1* | 1/2006 | Roberts | G06Q 30/02 705/14.57 |
| 2008/0103887 A1 | 5/2008 | Oldham et al. | |
| 2008/0133336 A1 | 6/2008 | Altman et al. | |
| 2008/0248815 A1 | 10/2008 | Busch | |
| 2008/0318559 A1 | 12/2008 | Porco | |
| 2009/0042557 A1* | 2/2009 | Vardi | H04W 72/02 455/422.1 |
| 2009/0187466 A1 | 7/2009 | Carter et al. | |
| 2010/0008337 A1 | 1/2010 | Bajko | |
| 2010/0094878 A1 | 4/2010 | Soroca et al. | |
| 2010/0121567 A1 | 5/2010 | Mendelson | |
| 2010/0228612 A1 | 9/2010 | Khosravy et al. | |
| 2011/0010245 A1 | 1/2011 | Priebatsch et al. | |
| 2011/0028160 A1* | 2/2011 | Roeding | G06Q 30/00 455/456.1 |
| 2011/0029359 A1 | 2/2011 | Roeding et al. | |
| 2011/0035265 A1 | 2/2011 | King et al. | |
| 2011/0035284 A1 | 2/2011 | Moshfeghi | |
| 2011/0040626 A1 | 2/2011 | Lin | |
| 2011/0170837 A1 | 7/2011 | Barnes, Jr. | |
| 2011/0178862 A1 | 7/2011 | Daigle | |
| 2011/0189980 A1 | 8/2011 | Proulx et al. | |
| 2011/0190009 A1 | 8/2011 | Gerber, Jr. et al. | |
| 2011/0238476 A1 | 9/2011 | Carr et al. | |
| 2011/0246148 A1 | 10/2011 | Gupta et al. | |
| 2011/0246306 A1 | 10/2011 | Blackhurst et al. | |
| 2011/0270618 A1 | 11/2011 | Banerjee et al. | |
| 2011/0270673 A1 | 11/2011 | Lin et al. | |
| 2011/0274094 A1 | 11/2011 | Jovicic et al. | |
| 2011/0276385 A1 | 11/2011 | Keller | |
| 2012/0209732 A1* | 8/2012 | Jeong | G06Q 20/3224 705/17 |
| 2013/0188626 A1* | 7/2013 | Lakhzouri | H04W 4/02 370/338 |
| 2013/0225209 A1 | 8/2013 | Chen et al. | |
| 2013/0310080 A1* | 11/2013 | Palanki | G01S 5/0236 455/456.3 |
| 2014/0018095 A1* | 1/2014 | Parvizi | H04W 4/025 455/456.1 |
| 2016/0048863 A1 | 2/2016 | Kramer et al. | |
| 2016/0097545 A1* | 4/2016 | Chang | F24D 19/1009 237/8 A |

FOREIGN PATENT DOCUMENTS

| | | |
|---|---|---|
| WO | 2010112819 A1 | 10/2010 |
| WO | 2011080517 A2 | 7/2011 |

OTHER PUBLICATIONS https://www.americanexpress.com/us/small-business/openforum/articles/how-to=win-back-customers-with-e-mail-marketing/, in Office Action for U.S. Appl. No. 14/197,808 dated Feb. 27, 2017.

* cited by examiner

|   | A | B | C | D | E |
|---|---|---|---|---|---|
| 1 | AP1, SSA1; AP2, SSA1; AP3, SSA1 | AP1, SSB1; AP2, SSB1; AP3, SSB1 | AP1, SSC1; AP2, SSC1; AP3, SSC1 | AP1, SSD1; AP2, SSD1; AP3, SSD1 | AP1, SSE1; AP2, SSE1; AP3, SSE1 |
| 2 | AP1, SSA2; AP2, SSA2; AP3, SSA2 | AP1, SSB2; AP2, SSB2; AP3, SSB2 | AP1, SSC2; AP2, SSC2; AP3, SSC2 | AP1, SSD2; AP2, SSD2; AP3, SSD2 | AP1, SSE2; AP2, SSE2; AP3, SSE2 |
| 3 | AP1, SSA3; AP2, SSA3; AP3, SSA3 | AP1, SSB3; AP2, SSB3; AP3, SSB3 | AP1, SSC3; AP2, SSC3; AP3, SSC3 | AP1, SSD3; AP2, SSD3; AP3, SSD3 | AP1, SSE3; AP2, SSE3; AP3, SSE3 |

SYSTEM AND METHOD FOR UPDATING AN ACCESS POINT MODEL

CROSS REFERENCE TO RELATED APPLICATIONS

The present application is a continuation of U.S. application Ser. No. 14/197,808, filed on Mar. 5, 2014, which claims the benefit of the filing date of U.S. Provisional Patent Application No. 61/773,276, filed on Mar. 6, 2013, the entire disclosures of which are hereby incorporated by reference herein.

BACKGROUND

Modern mobile devices are typically equipped with location-based features. These devices use signals from GPS satellites to identify a location, determine a direction of motion, and other navigation functions. Typically, in locations where the GPS satellite signals are weak (e.g., indoors), GPS may not function well or at all. To provide indoor navigation, some devices may use other information such as wireless network signals, Bluetooth signals, compass data, and accelerometer data as well as existing floor plan maps and pre-generated databases or indices of measurement. In certain instances, maps provided to the mobile device may be out of date or unreliable if the data upon which the maps are based is stale, insufficient, or otherwise inadequate.

BRIEF SUMMARY

In accordance with aspects of the technology, a method is provided. The method includes determining, by one or more processors, that a wireless access point model does not meet a predetermined quality threshold for a set of stored wireless access point data; in response to determining that the wireless access point model does not meet the predetermined quality threshold, identifying, by the one or more processors, a given wireless access point associated with the wireless access point model; generating, by the one or more processors, a request for current scan information of the given wireless access point, the request for current scan information being associated with a location within a wireless communication range of the given wireless access point; transmitting the request to one or more mobile communication devices, the request requesting each mobile communication device to travel within the wireless communication range of the given wireless access point to collect the current scan information; verifying, by the one or more processors, that at least one of the one or more mobile communication devices has traveled within the wireless communication range of the given wireless access point to collect the current scan information; receiving, by the one or more processors, the current scan information from the verified at least one mobile communication device; and modifying, by the one or more processors, the wireless access point model in accordance with the received current scan information by updating the set of stored wireless access point data.

In one example, the method further includes generating the access point model for a point of interest, the access point model comprising the stored wireless access point data of the given wireless access point. In another example, transmitting the request includes providing directions to the location within the wireless communication range of the given wireless access point. And in a further example, the wireless access point model includes an indoor map.

According to an alternative, verifying includes detecting a location of the at least one mobile communication device. For instance, verifying may include detecting transmission of an infrared or other wireless signal by the at least one mobile communication device.

In another example, the predetermined quality threshold is an amount of time since data was last collected at the given wireless access point. In a further example, the predetermined quality threshold is an aggregate amount of data associated with the wireless access point model.

According to another scenario, prior to transmitting the request the method further includes determining whether any of the one or more mobile communication devices are within a predetermined distance from the given wireless access point. The predetermined distance may be variable in accordance with whether the location is in an urban, suburban, or rural area. The predetermined distance may be variable in accordance with an amount of foot traffic expected at the location. Or the predetermined distance may be variable in accordance with an observed wireless communication range of the given wireless access point.

In accordance with other aspects of the technology, a device is provided that includes memory storing instructions and one or more processors coupled to the memory. The one or more processors are configured to execute the instructions to determine that a wireless access point model does not meet a predetermined quality threshold for a set of stored wireless access point data. In response to the determination that the wireless access point model does not meet the predetermined quality threshold, the processors identify a given wireless access point associated with the wireless access point model and generate a request for current scan information of the given wireless access point. The request for current scan information is associated with a location within a wireless communication range of the given wireless access point. The processors are also configured to transmit the request to one or more mobile communication devices. The request requests that each mobile communication device to travel within the wireless communication range of the given wireless access point to collect the current scan information. The processors are able to verify that at least one of the one or more mobile communication devices has traveled within the wireless communication range of the given wireless access point to collect the current scan information and to receive the current scan information from the verified at least one mobile communication device. The one or more processors are also configured to modify the wireless access point model in accordance with the received current scan information by updating the set of stored wireless access point data.

In one example, the one or more processors are further configured to generate the access point model for a point of interest. The access point model includes the stored wireless access point data of the given wireless access point. In another example, the one or more processors are further configured to provide directions to the location within the wireless communication range of the given wireless access point as part of the request.

In an alternative, the verification includes detecting a location of the at least one mobile communication device. For instance, the verification may comprise detecting transmission of an infrared or other wireless signal by the at least one mobile communication device.

In another example, prior to transmitting the request, the one or more processors are further configured to determine whether any of the one or more mobile communication devices are within a predetermined distance from the given wireless access point. For instance, the predetermined distance may be variable in accordance with one or more of (a) whether the location is in an urban, suburban, or rural area, and (b) an amount of foot traffic expected at the location. Alternatively, the predetermined distance is variable in accordance with an observed wireless communication range of the given wireless access point.

DETAILED DESCRIPTION

Aspects, features and advantages of this disclosure will be appreciated when considered with reference to the following description and accompanying figures. It should be noted that the same reference numbers in different drawings may identify the same or similar elements.

The disclosure provides a system and method for obtaining information to update an access point model. In one example, a wireless access point model may be generated. The access point model may be based in part on access point model data, e.g., collected scan information from devices that travel through an indoor space associated with the model. The wireless access point model may include an indoor map of a location or building, such as a store or a portion of a store. At some point, it may be determined that the access point model data does not meet a predetermined quality threshold. For example, the data may be outdated or inaccurate. A request may be generated and transmitted to a client device within a predetermined distance of the access point associated with the access point model. When the client device accepts the request and enters the indoor space associated with the access point, scan information may be collected from the client device. The scan information may be used to update or otherwise modify the access point model.

Figure 1:
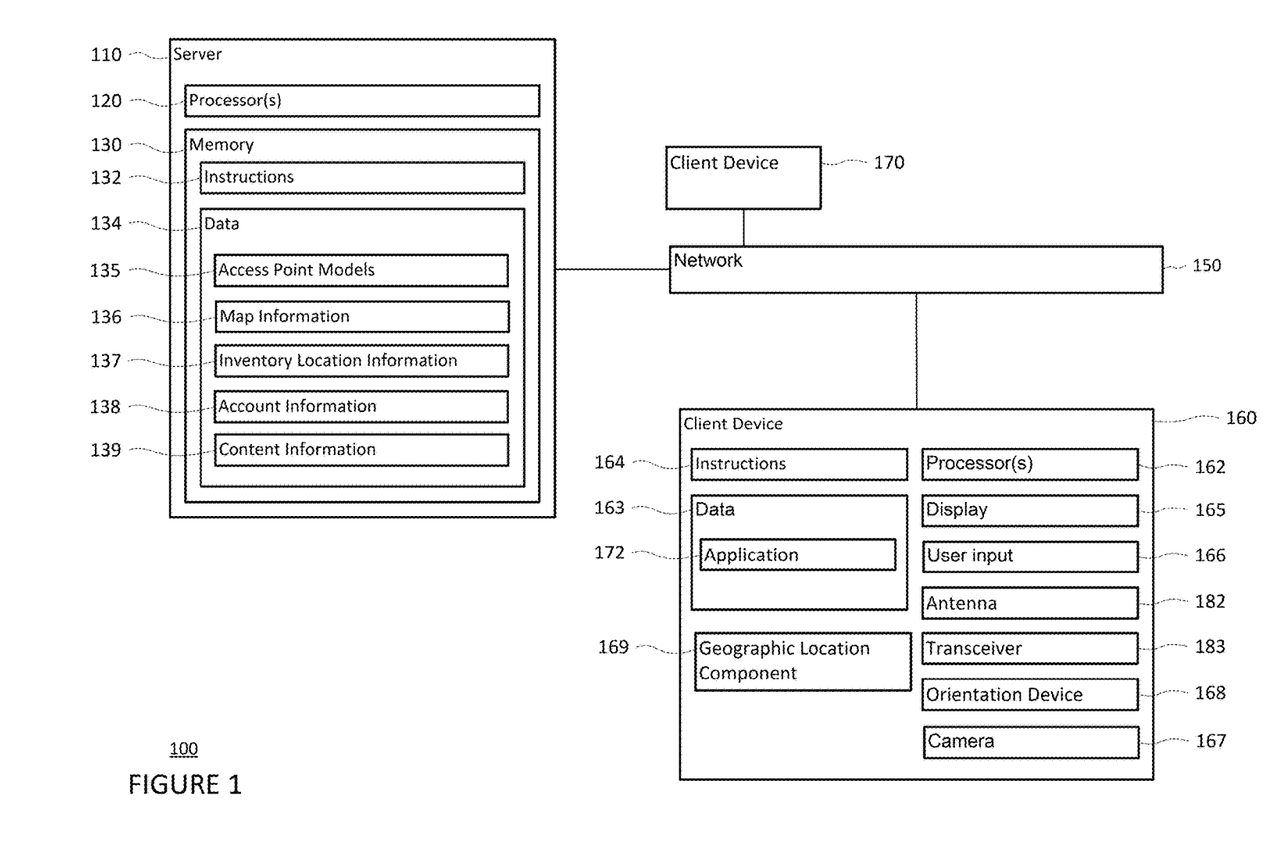
FIG. 1 is a functional diagram of a system in accordance with the disclosure.
Figure 2:
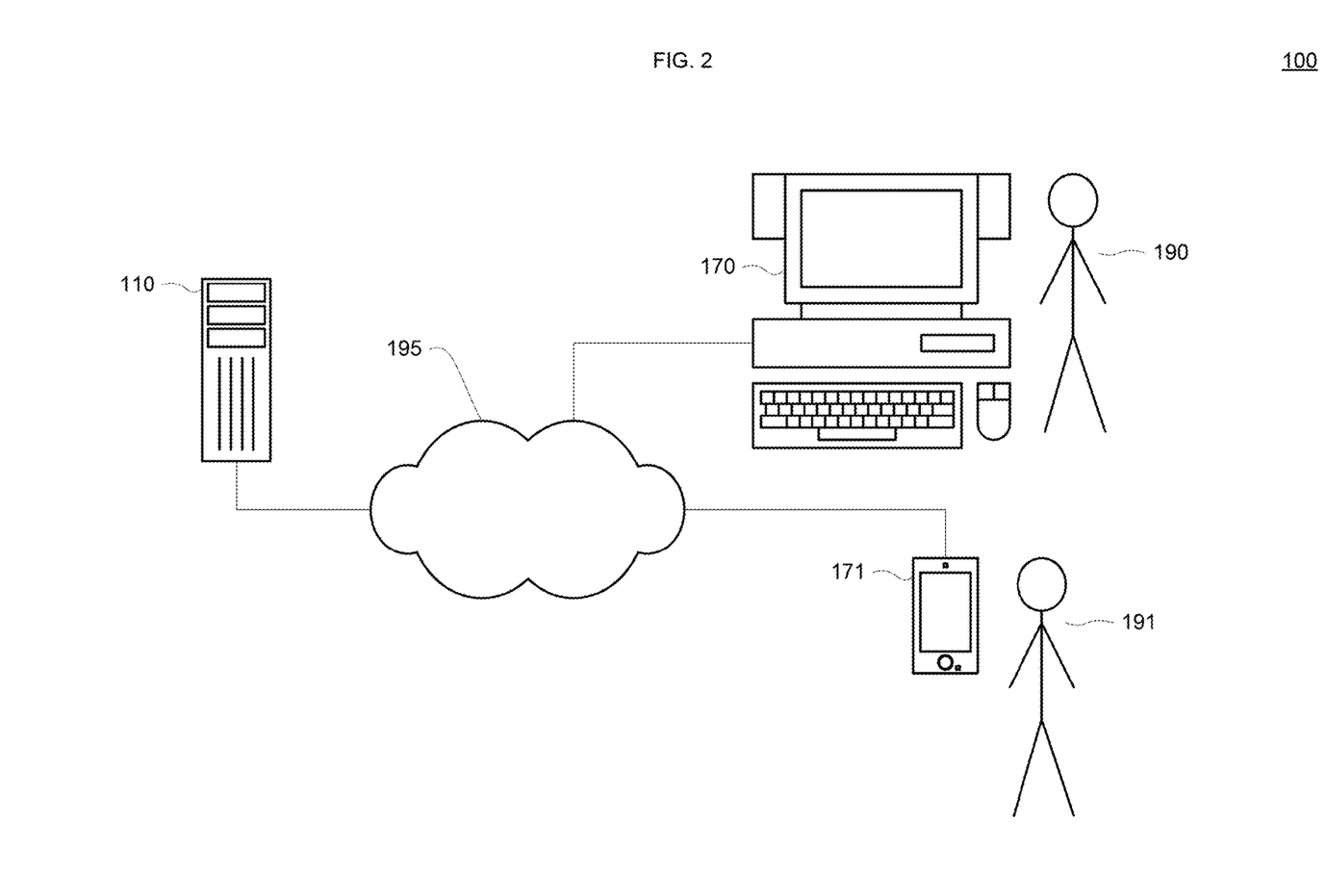
FIG. 2 is a pictorial diagram of a system in accordance with the disclosure.

The computer 110 may be at one node of a network 150 and capable of directly and indirectly communicating with other nodes of the network. For example, the computer 110 may comprise a web server that is capable of communicating with client devices 160 and 170 via network 150 such that server 110 uses network 150 to transmit and present information to a user on display 165 of client device 160. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

As shown in FIGS. 1-2, a system 100 for use with an implementation includes a computer 110 containing a processor 120, memory 130 and other components typically present in general purpose computers. The processor 120 may be any conventional processor, such as a commercially available CPU. Alternatively, the processor may be a dedicated controller such as an ASIC or other hardware-based processor. Although FIG. 1 functionally illustrates the processor and memory as being within the same block, the processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The memory 130 stores information accessible by processor 120, including instructions 132, and data 134, including map information 136, inventory location information 137, account information 138, and content information 139, which will be described in greater detail below, that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The server 110 and client computers 160 and 170 are capable of direct and indirect communication, such as over network 150. Although only a few computers are depicted in FIGS. 1-2, it should be appreciated that a typical system can include a large number of connected computers, with each different computer being at a different node of the network 150. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

Each client device may be configured similarly to the server 110, with a processor, memory and instructions as described above. Each client device 160 or 170 may be a personal computer intended for use by a person 190-191, and have all of the components normally used in connection with a personal computer such as a processor (e.g., a CPU) 162, memory (e.g., RAM and internal hard drives) storing data 163 and instructions 164, an electronic display 165 (e.g., a monitor having a screen, a touch-screen, a projector, a television, a computer printer or other device that is operable to display information), end user input 166 (e.g., a mouse, keyboard, touch-screen or microphone), and a camera 167. The client device may also include speakers, a network interface device, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA, a cellular phone, a tablet PC, or a netbook capable of obtaining information via the Internet. The user may input information using a small keyboard (in the case of a PDA-type phone), a keypad (in the case of a typical cellular phone) or a touch screen (in the case of a PDA).

The client devices may include an antenna 182 and a transceiver 183, which may be used to scan the wireless network spectrum and identify local wireless network signals. For example, many wireless network access points may operate in the 2.4 GHz frequency band and the signals may be based on 802.11, 802.11b, g, n, or other such standards. The access point may transmit and the antenna may receive "beacon" messages according to the aforementioned standards. The antenna may send the beacon messages to the receiver which demodulates the information to identify wireless network access points and associated signal strengths. In one example, these beacon messages may be IEEE 802.11 management frames transmitted by access points to announce themselves to potential wireless network users. These frames may contain Service Set Identifier ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based.

Data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

Client devices 160 and 170 may also include an orientation device 168, such as an accelerometer, gyroscope, compass, or any combination of these, to determine the direction in which the device is oriented. For example, an accelerometer may be used to detect the effect of gravity on the client device measured, for example, in meters per second per second. By way of example only, the client device may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device.

The orientation data received from the orientation device may be used in various ways. For example, an accelerometer or gyroscope may be used as a pedometer by running an average of the acceleration values to identify which direction is down (towards the Earth). A simple step detector may be constructed by deciding a step has been taken each time the component in the down direction is greater than an empirically-determined threshold. The distance of each step may be approximated by using an approximate stride length or speed of a person.

As shown in FIG. 1, the client devices may also include geographic position components to determine the geographic location of the client device. For example, client device 160 may include a geographic location component (position) 169 such as a GPS receiver. The receiver may be used by the processor of the client device to determine the device's latitude, longitude and altitude position. Thus, as the client device changes location, for example by being physically moved, using information from the GPS receiver, the processor may determine a new current location. The geographic position component may also comprise software for determining the position of the device based on other signals received at the client device, such as signals received from one or more cellular phone towers if the client device or wireless network access points. All or some of this location information may be transmitted by a participating client device to server 110.

Instructions of the client device may also include an application 172. The application may allow the user of the device to participate in a content serving service and to send and receive data with server 110.

Data 134 of server 110 may include a plurality of wireless network access point models 135. For example, each of the access point models 135 may be associated with a building, a "brick and mortar" store, or a portion thereof. In this regard, a building may be associated with one or more access point models 135. The access point models 135 may include the outline of an indoor space ("footprint") such as a building. For example, a footprint may include various constraints within the indoor space, such as walls, windows, doors, furniture and other features as well as measurements or reference data sufficient for the computer to determine the length of a wall or size of a room, etc. The model may also be associated with wireless network access point data (e.g., collected scan data from a mobile device) describing the expected wireless network access point signals and corresponding signal strengths expected to be detected by a device scanning for such signals at different locations of the map. The expected wireless network access point signals may be specific values or may be a range of values. A set of locations for an indoor space may also be associated with and/or determined based on various signals, such as radio frequency (RF) signals, light, sound, image recognition signals, and other types of signals and/or environmental factors or any combination thereof. For example, the signals may have been recorded from a number of previous scans of the indoor space using a mobile device such as client device 170. In some aspects, a model of the indoor space may be generated using one or more types of the signals discussed above.

The server may also access map information 136. The map information may include a series of floor plans representing an indoor space within a building. According to one aspect of the disclosure, the map information 136 may be based, at least in part, on the access point models 135 and the scan information associated therewith. The map information 136 may be based upon a series of walls representing locations where a user may not walk (or is not able to walk) within the building. The floor plan features may enable a user to navigate and identify various areas within an indoor space. In addition to floor plans and indoor spaces, map information 136 may also include general navigation information, such as street maps, traffic information, and may provide directions between points. The general navigation information, combined with the indoor maps, may provide a comprehensive map architecture that allows a user to navigate seamlessly between indoor spaces and outdoor spaces. All or a portion of the map information 136 may be transmitted to and stored by client devices 160 and 170 as needed.

The server may also access inventory location information 137 for different stores. For example, the inventory location information for one store may include information about the store, such as where products, services, displays or other features are located in the store. The server may use the inventory location information 137 to identify objects or other features which the client device is or was previously near.

Data 134 of server 110 may also include user account information 138 for a plurality of different users. In one example, the user account information may be generated after a user signs up to participate in a content serving service with server 110. Thus, the user account information may include login information such as user names, passwords or passphrases, device identifiers, etc., as well as other information provided by the user such as a home address, email address, or other contact information. In some examples, the user information may include a list of friends and family, co-participants, with which the user has pre-approved to share location and/or other information.

All or some of the user account information may also be stored at the client devices. Certain of the user account information, such as a device identifier, may also be used by a client device to identify the user of the device or the device itself to other devices of network 150.

The server 110 may also access content information 139. The content data may include for example, images, text, etc. used to generate information for display to a user. In some examples, the content may include advertisements and/or coupons. The content information may be classified into categories depending on location of the products associated with the advertisements and/or coupons.

Figure 3:
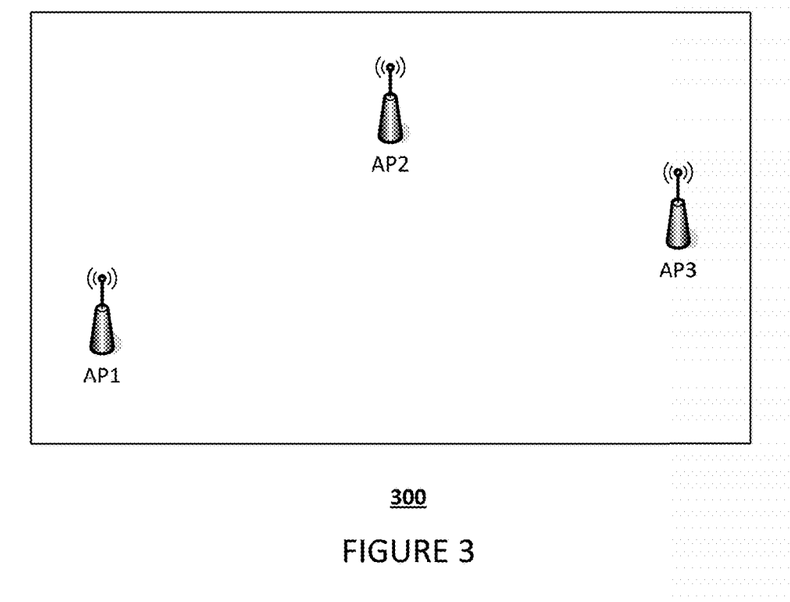
FIG. 3 is sample a map of a store in accordance with an aspect of the disclosure.

FIG. 3 is a top down view of an example indoor space for a store 300. While the examples used herein include fairly simple open spaces, it will be understood that floor plans (or maps) in accordance with the aspects disclosed herein may be much more complex or simpler based on the attributes of a particular building. The indoor space includes a plurality of wireless access points AP1, AP2, and AP3, located at various points within store 300. Each of the access points may transmit beacon messages including identifiers as described above.

Figure 4:
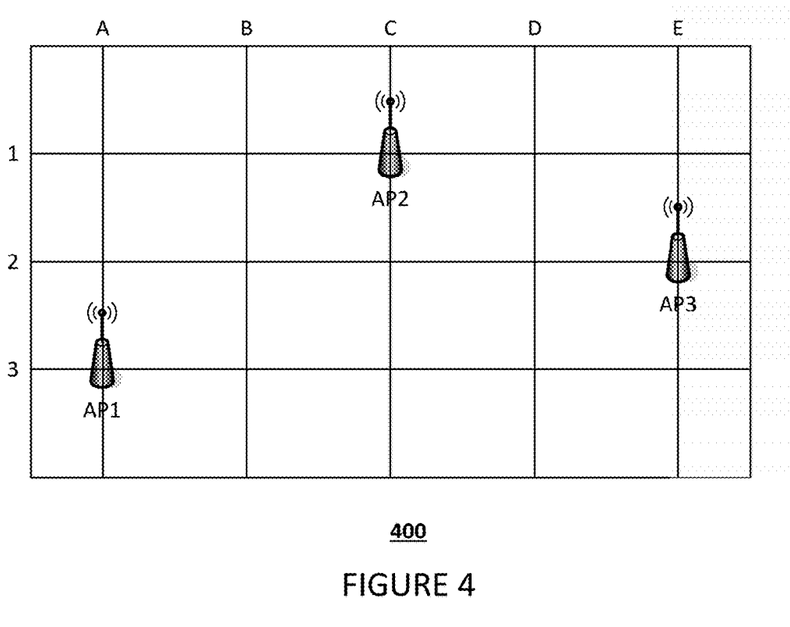
FIG. 4 is a coordinate map of a wireless network access point model for the store of FIG. 3 in accordance with aspects of the disclosure.

FIG. 4 depicts an example coordinate map 400 of the store 300. In this example, the map 400 may include coordinate system (A-E and 1-3) used to identify locations within the indoor space 300. As can be seen, access points AP1, AP2, and AP3 are located at coordinates A3, C1, and E2 respectively.

Figure 5:
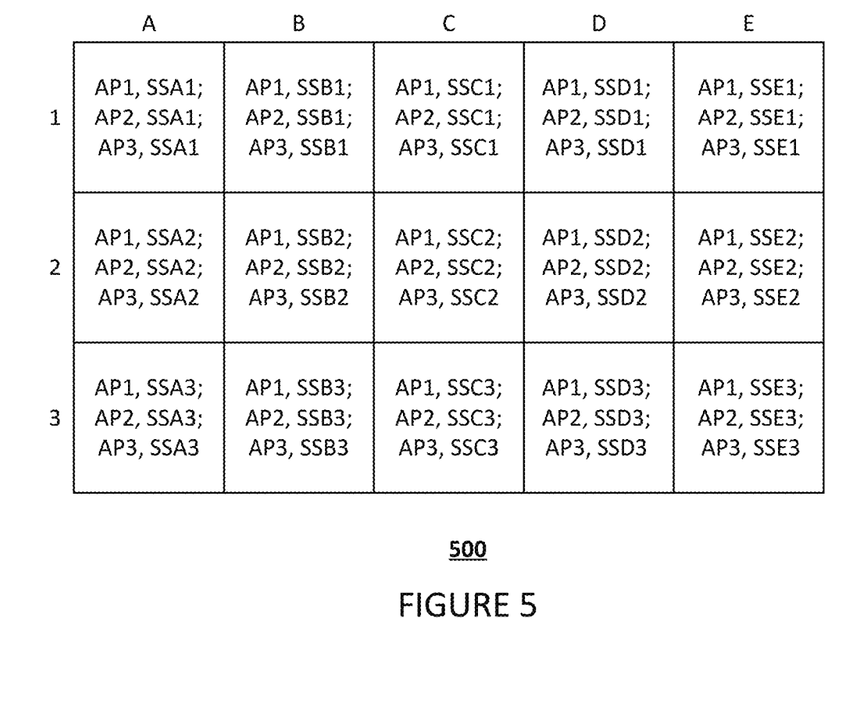
FIG. 5 is data of the wireless network access point model of FIG. 4 in accordance with aspects of the disclosure.

FIG. 5 depicts a table 500 including example wireless network access point model data for the store 300 based on the coordinate system of map 400. Each of the coordinate pair boxes of table 500 is associated with a specific point in the coordinate system of map 400 and includes wireless network access point data. In this example, the calculation of a location of a client device in the indoor space may involve calculating individual locator (e.g., latitude and longitude) coordinates one at a time or simultaneously.

While the examples of wireless network access points above refer to beacon messages according to 802.11, 802.11b, g, n, or other such standards, it is contemplated that wireless access points could include other technologies such as Bluetooth Low Energy Beacons, Ultrasound emitters and other technologies that could be used for location identification.

The wireless network access point model data may be collected by walking devices through the indoor space 300 and collecting scan information from the devices. The collected scan information may then be used to generate a set of access point identifiers and corresponding signal strengths for each of the coordinate pair boxes of table 500. For example, at location A3, the table 500 includes data indentifying access point AP1 and its corresponding signal strength SSA3 at location A3, access point AP2 and its corresponding signal strength SSA3 at location A3, and access point AP3 and its corresponding signal strength SSA3 at location A3. Similar data is associated with each of the coordinate boxes of table 500. As described in more detail below, the wireless network access point model for an store may be used to determine a client device's location in the store.

Each of the access point models 135 may be associated with a quality threshold that may be stored in the data 134 stored of the server 110. The quality threshold may represent a quality of the wireless access point model or the wireless access point data associated with a particular access point model.

The quality threshold may be determined based on one factor or a combination of many factors. For example, the quality threshold may represent a time period that has passed since data was collected at a wireless access point associated with a particular access point model. In this example, as discussed above, the data used to create the models may be collected by wireless access points from devices that travel within a range of the wireless access point. The range may at least partially overlap with a region defined by the access point model. The access point models 135 may include a time entry associated with the last time data was collected for a particular model. If the time entry associated with the last time data was collected extends beyond a predetermined period defined by the quality threshold, the processor 120 may determine that the quality of data of a particular model does not meet the quality threshold.

The quality threshold may also represent an aggregate amount of data associated with a particular location. For example, a measure of the amount of data used to generate an access point model may be determined. This may be measured in any units, such as bits, bytes, etc. If the aggregate amount of data is less than a predetermined amount defined by the quality threshold, the processor 120 may determine that the access point model does not meet the quality threshold. In another example, a particular wireless access point may have no wireless access point data or wireless access point model associated therewith. This may occur, for example, in a new building where there has not yet been an opportunity for mobile devices to collect data. In this regard, the aggregate amount of data associated with the wireless access point may be at or near zero and the particular wireless access point may not meet the quality threshold. In this example, the quality threshold may represent a predetermined amount of data, as is described above. Alternatively, the quality threshold may represent a data amount that is at or near zero. In another example, the aggregate amount of data for a particular location may be compared to the surrounding locations. If the aggregate amount of data for the particular location is less than each of the surround locations, or an average of the surround locations, then the processor 120 may determine that the access point model does not meet the quality threshold.

The quality threshold may also represent the overall accuracy or precision of the access point model. In this example, a client device may pass through a region defined by a network access model, and may navigate according to the same. If the access model contradicts, or is otherwise inconsistent with, the physical space being modeled, the device may notify the server 110. This notification may be stored with the network access model. The quality threshold may represent a predefined number of notifications, such that, when the predefined number of notifications is met, the processor 120 may determine that the quality of data of a particular model does not meet the quality threshold.

Any of the above examples may serve as a basis for the quality threshold, either alone or in combination with other examples above as well as other examples not mentioned above. Additionally, while the examples above depict a quality threshold as being used in the determination of whether an access point model needs to be updated, a request for an updated access model point may be generated manually, such as by an administrator overseeing or operating the server 110.

While the example of store 300 includes only 3 wireless network access points located on the same level, any number of wireless network access points may be used and may be located at different levels within the same or different indoor spaces. For example, rather than using two coordinates (x, y), the models may have a triplet coordinate system (x, y, z) to identify locations on multiple levels. Thus, different wireless access point models for different indoor locations may include significantly more or less detail than table 500.

In addition, while the wireless network access point model is depicted herein as a coordinate-based map, various other map schemes may also be used. For example, the wireless network access point model may actually comprise a list of locations and corresponding wireless access point identifiers and signal strengths, a topographical or intensity map of wireless access point identifiers and signal strengths, one or more decision or regression trees, etc. As with the coordinate-based maps described above, these models may also be used to determine a client device's location in a store.

The client device may also receive and store data provided by the server 110, including, for example, all or portions of the wireless network access point models, inventory location information, user account information, and content. Thus, a client device may also perform all or some of the functions identified below as being performed by a server.

As described above, the processor 120 may determine that the quality of data of a particular model does not meet the quality threshold. Such determination may be made by periodically comparing the quality of data to the quality threshold at a predetermined interval. The interval may be any period of time, such as a day, a week, a month, etc. In this regard, if the server queries the data quality with respect to the threshold and the data quality meets the threshold, the server may conduct another query based on the predetermined interval. In another example, the determination may be automatically triggered when the quality of data does not meet the threshold. Upon making this determination, the processor may determine a location of a wireless access point associated with the particular model that does not meet the quality threshold and may generate a request for scan information to be collected by that wireless access point. In this regard, the data collected by the wireless access point may be used to update, correct, or otherwise modify the particular model, as described above. In another example, the request for scan information may be generated manually, for example, by a network administrator.

The wireless access point associated with the request may be associated with a particular inventory item from the inventory location information 137. The processor may identify a particular inventory item at a location associated with the wireless access point. For example, when the processor 120 determines that an access point model associated with the request for scan information corresponds to a shoe store, the processor 120 may associate a particular brand of shoe offered for sale at the shoe store with the request. In another example, the access point model associated with the request may correspond to a particular section of a store, such as an electronics section of a department store. In this example, the request may include location information regarding a particular product available in the electronics section of the store.

In addition to the operations described below and illustrated in the figures, various operations will now be described. It should also be understood that the following operations do not have to be performed in the precise order described below. Rather, various steps may be handled in a different order or simultaneously. Steps may also be omitted or added unless otherwise stated herein.

In order to obtain the benefits of the techniques described herein, users may be required to install applications and/or select settings. For example, participants may be required to sign in to a service before any information is transmitted between the participant's client device and the server. Participants may also be provided with the opportunity to cease participation temporarily or permanently at any time.

After opting to participate, the participant's client device may transmit current geographic location information to the server. This may be done at a recurring predetermined time frequency, or alternatively it may be done in real-time. The participant may activate an application which allows the client device to transmit this information. In this regard, the participant may also deactivate the application when the participant does not want to share information with the server 110.

When a request for scan information is generated by the server, the server may determine if any participants are within a predetermined distance from the wireless access point associated with the request. This distance may be any distance, and may vary upon a number of factors. Such factors may include, for example, whether the location is in an urban, suburban, or rural area, the amount of foot traffic the particular location typically receives, the observed range of the wireless access point, as well as any other factor. Additionally, the predetermined distance may vary according to the age or number of requests. For example, if a request is not fulfilled within a predetermined time, subsequent requests may be generated and the distance may be increased to encompass more participants.

If a participant is within the predetermined distance of the location associated with the request, the participant may receive an incentive to travel to the location associated with the request. The incentive may provide an inducement to collect wireless access point data when the client device travels within a range of the wireless access point. The incentive may be transmitted to any number of client devices within the predetermined distance of the wireless access point or the wireless access point model. For example, the incentive may include content such as a coupon for a discount on an inventory item. In another example, the incentive may be a general coupon for a discount on any item in a store. In one implementation, the inventory item or the store may be associated with the wireless access point model associated with the request for scan information. In yet another example, the coupon may be a general advertisement for a product, service, or a provider of such product or service. The incentives may take on any number of forms, and are not limited to monetary incentives. For example, the incentive may include social media incentives, such as points, virtual money, or any other type of social media incentive.

The selected content may be transmitted to the client device for display to the participant. Any number of notifications can be used. For example, the client device may give an audible notification when the content is received and display a text message. In another example, the content may be sent to the user for a later shopping trip. In this example, the user account information may include the user's email, and the content, for example a coupon for another shopping trip, may be emailed to the user's email address.

In addition to the incentive, a participant may receive directions from the server to a location within the range of the wireless access point. For example, the directions may be related to the incentive, such that the directions may guide a user to the advertised product or service. Alternatively, such directions may be generated at the participant's device. Such directions may include any combination of turn-by-turn type directions, such as driving or walking directions, directions that utilize public transportation, directions that include indoor maps, or any other type of directions.

A participant may travel to the location associated with the incentive. For example, a participant may walk, drive a motor vehicle, use public transportation, or any other form of transport to arrive at the location. Once at the location, the user may redeem the incentive. For example, the participant may redeem a coupon that was included in an advertisement. In this regard, the client device may facilitate redemption of the coupon. For example, the client device may display a coupon bar code that can be scanned at a check out register. The device may also transmit the coupon via an infrared (IR) interface coupled to the device. Other types of wireless communication protocols may also be used to transmit the coupon from the client device.

The server may verify that the participant traveled to the location by verifying redemption of the incentive. The verification process may also include verifying that a participant travelled to the a participant going to a location in the indoor space, waiting for a particular time before entering a space, or any other event which suggests that the participant utilized the advertisement. According to some aspects, a temporal limitation may be associated with the determination of whether a conversion event occurred. For example, it may be periodically determined whether a redemption related to the incentive took place within a given number of hours. After that time period, for example, it may be assumed that the participant will not respond to the incentive. In another example, verification may occur when a user scans a barcode of a product at a particular location. In this regard, the location of the product may be ascertained from inventory location information 137. In yet another example, near-field communications may be used to identify the presence of a participant at a particular location.

Additionally, the server, via an access point, may collect scan information from the participant. The scan information may be used by the server to improve, update, correct, or otherwise alter the particular access point model.

Although the examples above depict the processing of log information to select content occurring primarily at the server, aspects of the processing may also be performed at the client device. For example, when the user activates the application, the application may send a request including the location information to the server. In response, the server may send all or part of the wireless network access point model for the store. In this regard, the client device may do the processing to determine its own current location and behavior information using the wireless network access point model.

Figure 6:
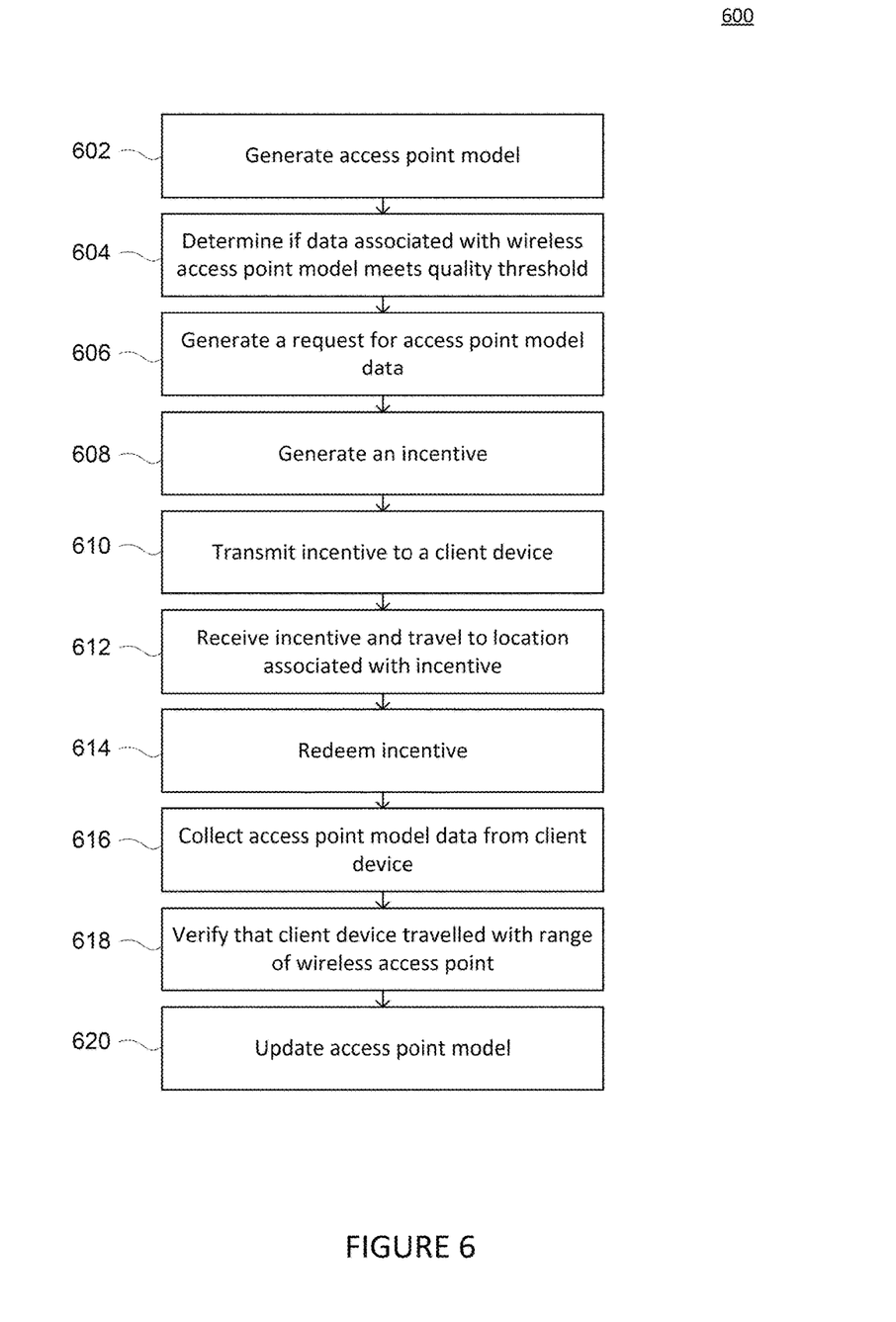
FIG. 6 is a flow diagram in accordance with aspects of the disclosure.

FIG. 6 is a flow chart depicting a method 600 of collecting scan information according to one aspect of the disclosure. At block 602, an access point model may be generated at a server. As described above, the access point model may be a map of an indoor space, and may be generated using collected scan information from devices that travel within a range of a wireless access point associated with the model.

At block 604, the server may determine that the data associated with a wireless access point model does not meet a quality threshold. As described above, the quality threshold may be determined using any one or a combination of factors. For example, the quality threshold may be an amount of time since scan information was collected by a wireless access point associated with the access point model.

At block 606, the server may generate a request for additional scan information to be collected at a wireless access point associated with the access point model.

At block 608, an incentive may be generated at the server. As described above, the incentive may be a coupon, discount, advertisement, social media incentive, or any other type of incentive. The incentive may be associated with a product or other inventory item that is associated with the access point model that does not meet the quality threshold. In this regard, an incentive may be for a product or service that may be redeemed within the range of the wireless access point.

At block 610, the incentive may be transmitted to a client device within a predetermined distance of the wireless access point associated with the request for scan information.

At block 612, a user of the client device may receive the incentive and may travel to the location associated with the incentive. As described above, the incentive may be displayed on a client device. The client device may also display directions to redeem the incentive.

At block 614, a user may redeem the incentive. This may include purchasing a product or inventory item associated with a coupon, or discount, or redeeming a social media incentive.

At block 616, the wireless access point may collect wireless scan information from the client device when the client device is in a range of the wireless access point.

At block 618, the server may verify that the client device has traveled within a range of the wireless access point. If the client device has travelled within the range of the wireless access point, the server may proceed to block 620. In one example, the incentive may not cause the user of a client device to travel to the wireless access point. In this regard, the server may determine that a client device has not traveled within a range of the wireless access point. The server may then return to block 608, where it may generate an additional incentive. In one example, the predetermined distance may be increased or modified depending on the response rate. At block 620, the server may update the access point model with the collected scan information.

As these and other variations and combinations of the features discussed above can be utilized without departing from the systems and methods as defined by the claims, the foregoing description of exemplary implementations should be taken by way of illustration rather than by way of limitation of the disclosure as defined by the claims. It will also be understood that the provision of examples (as well as clauses phrased as "such as," "e.g.", "including" and the like) should not be interpreted as limiting the disclosure to the specific examples; rather, the examples are intended to illustrate only some of many possible aspects.

The invention claimed is:

1. A method comprising:
  determining, by one or more processors, that a wireless access point model does not meet a predetermined quality threshold for a set of stored wireless access point data;
  in response to determining that the wireless access point model does not meet the predetermined quality threshold, identifying, by the one or more processors, a given wireless access point associated with the wireless access point model;
  generating, by the one or more processors, a request for current scan information of the given wireless access point, the request for current scan information including an inducement for travel to a location within a wireless communication range of the given wireless access point;
  transmitting the request to one or more mobile communication devices not currently within the wireless communication range, the request requesting each mobile communication device to travel within the wireless communication range of the given wireless access point to collect the current scan information;
  verifying, by the one or more processors, that at least one of the one or more mobile communication devices has traveled within the wireless communication range of the given wireless access point to collect the current scan information in response to the transmitted request;
  receiving, by the one or more processors, the current scan information from the verified at least one mobile communication device;
  in response to receiving, by the one or more processors, the current scan information, providing, by the one or more processors, the inducement to the at least one of the one or more mobile communication devices for redemption; and
  modifying, by the one or more processors, the wireless access point model in accordance with the received current scan information by updating the set of stored wireless access point data.

2. The method of claim 1, further comprising:
  generating the access point model for a point of interest, the access point model comprising the stored wireless access point data of the given wireless access point.

3. The method of claim 1, wherein transmitting the request includes providing directions to the location within the wireless communication range of the given wireless access point.

4. The method of claim 1, wherein the wireless access point model includes an indoor map.

5. The method of claim 1, wherein the verifying includes detecting a location of the at least one mobile communication device.

6. The method of claim 5, wherein the verifying comprises detecting transmission of an infrared or other wireless signal by the at least one mobile communication device.

7. The method of claim 1, wherein the predetermined quality threshold is an amount of time since data was last collected at the given wireless access point.

8. The method of claim 1, wherein the predetermined quality threshold is an aggregate amount of data associated with the wireless access point model.

9. The method of claim 1, wherein, prior to transmitting the request, the method further comprises determining whether any of the one or more mobile communication devices are within a predetermined distance from the given wireless access point.

10. The method of claim 9, wherein the predetermined distance is variable in accordance with an amount of foot traffic expected at the location.

11. The method of claim 9, wherein the predetermined distance is variable in accordance with an observed wireless communication range of the given wireless access point.

12. The method of claim 9, wherein the predetermined distance from the given wireless access point is a variable in accordance with an age of the request.

13. The method of claim 9, wherein the request comprises a plurality of requests, and wherein the predetermined distance from the given wireless access point is a variable in accordance with a number of the plurality of requests.

14. A device comprising:
  memory storing instructions;
  one or more processors coupled to the memory, the one or more processors configured to execute the instructions to:
    determine that a wireless access point model does not meet a predetermined quality threshold for a set of stored wireless access point data;
    in response to the determination that the wireless access point model does not meet the predetermined quality threshold, identify a given wireless access point associated with the wireless access point model;
    generate a request for current scan information of the given wireless access point, the request for current scan information including an inducement for travel to a location within a wireless communication range of the given wireless access point;
    transmit the request to one or more mobile communication devices not currently within the wireless communication range, the request requesting each mobile communication device to travel within the wireless communication range of the given wireless access point to collect the current scan information;

verify that at least one of the one or more mobile communication devices has traveled within the wireless communication range of the given wireless access point to collect the current scan information in response to the transmitted request;

receive the current scan information from the verified at least one mobile communication device;

in response to receiving the current scan information, provide the inducement to the at least one of the one or more mobile communication devices for redemption; and modify the wireless access point model in accordance with the received current scan information by updating the set of stored wireless access point data.

15. The device of claim 14, wherein the one or more processors are further configured to generate the access point model for a point of interest, the access point model comprising the stored wireless access point data of the given wireless access point.

16. The device of claim 14, wherein the one or more processors are further configured to provide directions to the location within the wireless communication range of the given wireless access point as part of the request.

17. The device of claim 14, wherein the verification includes detecting a location of the at least one mobile communication device.

18. The device of claim 17, wherein the verification comprises detecting transmission of an infrared or other wireless signal by the at least one mobile communication device.

19. The device of claim 14, wherein, prior to transmitting the request, the one or more processors are further configured to determine whether any of the one or more mobile communication devices are within a predetermined distance from the given wireless access point.

20. The device of claim 19, wherein the predetermined distance is a variable in accordance with:
whether the location is in an urban, suburban, or rural area; and
an amount of foot traffic expected at the location.

21. The device of claim 19, wherein the predetermined distance is variable in accordance with an observed wireless communication range of the given wireless access point.

* * * * *